T. C. March,

Ornamenting Mirrors.

N°62,654.   Patented Mar. 5, 1867.

Witnesses:
G. F. Warren
John Dean

Inventor:
Tho. C. March

United States Patent Office.

THOMAS C. MARCH, OF LONDON, ENGLAND.

Letters Patent No. 62,654, dated March 5, 1867.

MODE OF ORNAMENTING MIRRORS.

The Schedule referred to in these Letters Patent and making part of the same.

TO ALL WHOM IT MAY CONCERN:

Be it known that I, THOMAS CHARLES MARCH, of London, have invented certain new and useful Improvements Applicable to the Decoration of Articles of Furniture, part of which improvements may also be applied for architectural ornamentation; and I do hereby declare that the following taken in connection with the drawings which accompany and form part of this specification, is a description of my invention sufficient to enable those skilled in the art to practise it.

These improvements relate to a mode of ornamenting mirrors or glasses by means of beads, buttons, beadings, or garlands, made of glass and attached to the surface of said mirrors or glasses by means of a transparent cement; and in order that the said improvements be clearly understood, I have illustrated them in the three first figures of the accompanying sheet of drawings, wherein—

Figure 1:
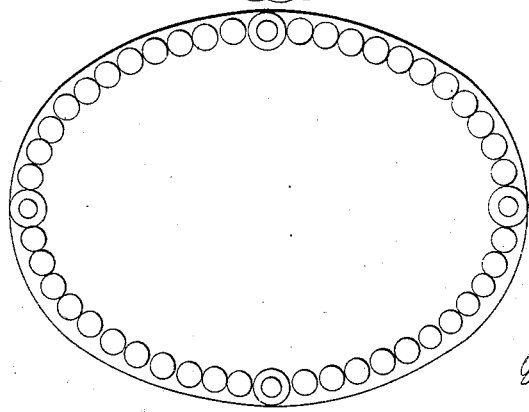

Figure 1 is a front view of a mirror, the outline of which is decorated with spherical beads and other ornaments, arranged so as to form an ornamental frame to said mirror, the various pieces of glass employed for this end being rendered adherent to the mirror by means of cement. In order to facilitate the cementing process, I form a flat polished surface on one side of the beads so as to insure their adherence to the glass, and, if required, previous to cementing I coat the said flattened surface with a thin layer of silver. The mirror itself is protected by a back made of wood or any other appropriate material, which can be affixed to the same either by strips of paper pasted on the edge of the glass, or by metallic fastenings or by any other appropriate device, which should be as thin as possible so as not to augment unnecessarily the thickness of the glass.

Figure 2:
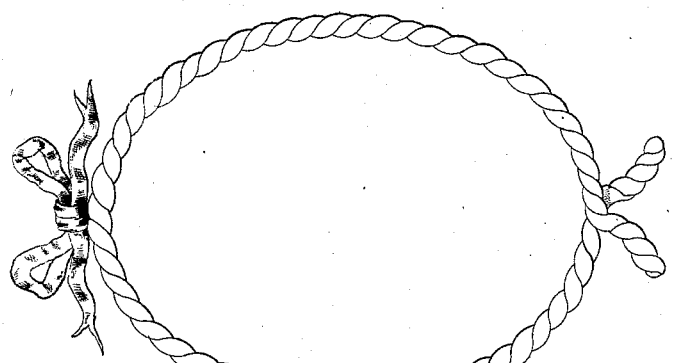

Figure 2 represents a mirror ornamented in the same manner except that the detached beads are here replaced by a wreath of twisted glass, which might, if required, be formed of one piece and bent while hot to the form of the said mirror, or the said wreath can be formed by compressing heated glass in an appropriate mould, and after grinding one of its faces so as to secure a perfect surface, it can be cemented on to the mirror in the manner above described; certain detached ornaments, such as the bunch of rosettes, &c., forming part of the frame, can be affixed separately.

Figure 3:
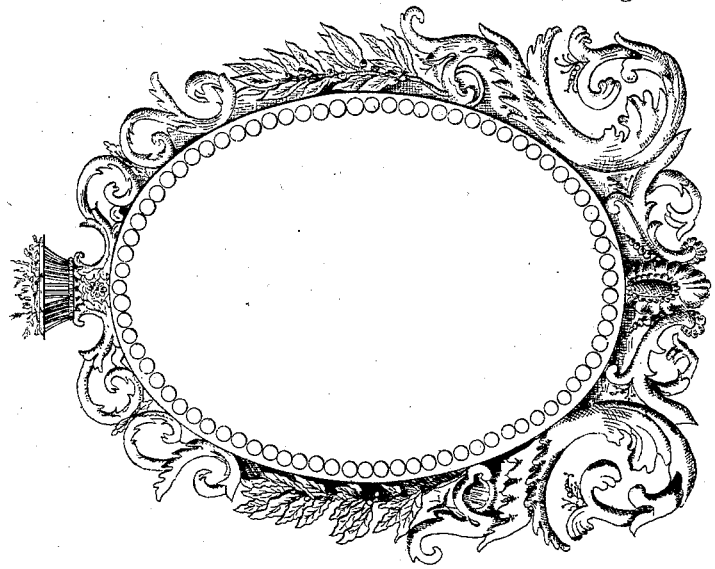

Figure 3 represents a mirror whose face is ornamented with beads, and mounted in a framework of gilded wood or any other appropriate material.

All these various kinds of mirrors, so long as they are within a reasonable size, can be mounted on pedestals of ornamental metal, wood, or other convenient material. The shapes, sizes, and distance apart of the beads can vary indefinitely, and they can also be composed of different-colored beads so as to imitate the effect of precious stones. In order to augment still more the brilliancy of the mirrors represented in the three first figures, I propose in certain cases to silver, or even to gild, externally all that part of said mirrors existing outside of the border formed either by the beads or by the wreath. This kind of ornamentation can also be applied to various kinds of furniture, such as angle brackets, book-racks, table-tops, as well as to epergnes for receiving flowers or fruits for the dinner-table or drawing-room.

I claim the ornamentation of mirrors, &c., by affixing to the surfaces of the same by cement, glass knobs, beads, or mouldings, prepared by grinding the face to be attached, substantially as set forth.

THOS. C. MARCH.

Witnesses:
G. F. WARREN,
JOHN DEAN.
} Both of No. 17 Gracechurch Street, London, E. C.